(12) United States Patent
Shaske

(10) Patent No.: US 11,594,994 B2
(45) Date of Patent: Feb. 28, 2023

(54) SELECTABLE CURRENT LIMITING FOR POWER TOOL

(71) Applicant: MILWAUKEE ELECTRIC TOOL CORPORATION, Brookfield, WI (US)

(72) Inventor: Benjamin F. Shaske, Pewaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 270 days.

(21) Appl. No.: 17/111,968

(22) Filed: Dec. 4, 2020

(65) Prior Publication Data

US 2021/0175833 A1 Jun. 10, 2021

Related U.S. Application Data

(60) Provisional application No. 62/946,072, filed on Dec. 10, 2019.

(51) Int. Cl.
*H02P 6/14* (2016.01)
*H02P 27/08* (2006.01)
*H02K 5/00* (2006.01)
*H02K 11/27* (2016.01)

(52) U.S. Cl.
CPC .............. *H02P 27/08* (2013.01); *H02K 5/00* (2013.01); *H02K 11/27* (2016.01)

(58) Field of Classification Search
CPC .......... H02P 27/08; H02P 29/027; H02P 6/28; H02K 5/00; H02K 11/27
See application file for complete search history.

(56) References Cited

U.S. PATENT DOCUMENTS

| | | | |
|---|---|---|---|
| 6,237,698 B1 | 5/2001 | Carrier et al. | |
| 6,286,609 B1 | 9/2001 | Carrier et al. | |
| 6,296,065 B1 * | 10/2001 | Carrier | H02J 7/0068 173/171 |
| 6,460,626 B2 | 10/2002 | Carrier | |
| 6,675,912 B2 | 1/2004 | Carrier | |
| 6,741,051 B2 | 5/2004 | Chu | |
| 8,179,069 B2 | 5/2012 | Matsunaga et al. | |
| 8,353,362 B2 | 1/2013 | Liebhard et al. | |
| 8,552,669 B2 | 10/2013 | Kusakawa | |

(Continued)

FOREIGN PATENT DOCUMENTS

EP 2835223 A1 2/2015

OTHER PUBLICATIONS

International Search Report and Written Opinion for Application No. PCT/US2020/063254 dated Mar. 29, 2021 (11 pages).

*Primary Examiner* — Muhammad S Islam
(74) *Attorney, Agent, or Firm* — Michael Best & Friedrich LLP

(57) ABSTRACT

Selectable current limiting for a power tool. One embodiment provides a method for selectable current limiting for a power tool including determining, using a current sensor, an average current and determining whether the average current exceeds a predetermined current threshold. The method also includes determining a deviation of the average current from the predetermined current threshold and reducing a PWM duty ratio proportional to the deviation of the average current from the predetermined current threshold. The PWM duty ratio corresponds to a PWM signal provided to an inverter bridge.

20 Claims, 4 Drawing Sheets

(56) References Cited

U.S. PATENT DOCUMENTS

| | | |
|---|---|---|
| 8,810,170 B2 | 8/2014 | Brattoli et al. |
| 8,964,429 B2 | 2/2015 | Horie et al. |
| 9,314,900 B2 | 4/2016 | Vanko et al. |
| 9,337,763 B2 | 5/2016 | Funabashi et al. |
| 9,406,915 B2 | 8/2016 | White et al. |
| 9,583,745 B2 | 2/2017 | White et al. |
| 9,583,793 B2 | 2/2017 | White et al. |
| 9,673,738 B2 | 6/2017 | Miller et al. |
| 9,762,153 B2 * | 9/2017 | Forster ................ B24B 23/028 |
| 9,871,484 B2 | 1/2018 | White et al. |
| 9,893,384 B2 | 2/2018 | Velderman et al. |
| 10,050,572 B2 | 8/2018 | Pant et al. |
| 10,056,582 B2 | 8/2018 | White et al. |
| 10,177,701 B2 | 1/2019 | White et al. |
| 10,193,111 B2 | 1/2019 | Varpatis et al. |
| 10,236,819 B2 | 3/2019 | White et al. |
| 10,243,491 B2 | 3/2019 | Cox et al. |
| 10,250,178 B2 | 4/2019 | White et al. |
| 10,291,173 B2 | 5/2019 | Cox et al. |
| 2005/0200339 A1 | 9/2005 | Phillips et al. |
| 2013/0082627 A1 | 4/2013 | Ichikawa et al. |
| 2014/0054054 A1 | 2/2014 | Osborne et al. |
| 2016/0172933 A1 | 6/2016 | Strouse et al. |
| 2017/0019044 A1 | 1/2017 | Godlieb et al. |
| 2017/0093321 A1 | 3/2017 | Ichikawa |
| 2017/0104243 A1 | 4/2017 | Velderman et al. |
| 2017/0126051 A1 | 5/2017 | Cox et al. |
| 2017/0133965 A1 | 5/2017 | Ichikawa et al. |
| 2017/0338753 A1 | 11/2017 | Forster et al. |
| 2017/0338754 A1 | 11/2017 | Forster et al. |
| 2017/0338755 A1 | 11/2017 | Forster et al. |
| 2018/0076651 A1 | 3/2018 | Cox et al. |
| 2018/0076653 A1 | 3/2018 | Forster et al. |
| 2018/0076754 A1 | 3/2018 | White et al. |
| 2018/0090978 A1 | 3/2018 | Forster et al. |
| 2018/0090979 A1 | 3/2018 | Forster et al. |
| 2018/0248507 A1 | 8/2018 | Vanko et al. |
| 2018/0262152 A1 | 9/2018 | White et al. |
| 2018/0323734 A1 | 11/2018 | Pant et al. |
| 2019/0058435 A1 | 2/2019 | White et al. |
| 2019/0115772 A1 | 4/2019 | Takeda et al. |

* cited by examiner

SELECTABLE CURRENT LIMITING FOR POWER TOOL

RELATED APPLICATIONS

This application claims the benefit of U.S. Provisional Patent Application No. 62/946,072, filed on Dec. 10, 2019, the entire content of which is hereby incorporated by reference.

FIELD

The present disclosure relates to selectable power limiting in power tools, for example, in powered handheld pruners.

BACKGROUND

Hand-held power tools include a motor for operation of a tool bit. The current drawn by the motor varies based on the load on the tool bit. For example, more current may be drawn in high load situations (e.g., cutting through hard, thick wood) than in low load situations (e.g., cutting through soft, thin wood).

SUMMARY

Some embodiments provide a power tool including a housing, a motor within the housing, a current sensor configured to measure a current flow to the motor, an inverter bridge selectively providing power from a battery pack to the motor, and an electronic processor coupled to the current sensor and the inverter bridge. The electronic processor is configured to determine, using the current sensor, an average current and determine whether the average current exceeds a predetermined current threshold. The electronic processor is also configured to determine a deviation of the average current from the predetermined current threshold and reduce a PWM duty ratio proportional to the deviation of the average current from the predetermined current threshold. The PWM duty ratio corresponds to a PWM signal provided to the inverter bridge.

Some embodiments provide a method for selectable current limiting for a power tool including determining, using the current sensor, an average current and determining whether the average current exceeds a predetermined current threshold. The method also includes determining a deviation of the average current from the predetermined current threshold and reducing a PWM duty ratio proportional to the deviation of the average current from the predetermined current threshold. The PWM duty ratio corresponds to a PWM signal provided to the inverter bridge.

Some embodiments provide a power tool including a housing, a motor within the housing, a current sensor configured to measure a current flow to the motor, an inverter bridge selectively providing power from a battery pack to the motor, and an electronic processor coupled to the current sensor and the inverter bridge. The electronic processor is configured to determine, using the current sensor, an average current and determine whether the average current exceeds a predetermined current threshold. The electronic processor is also configured to determine a deviation of the average current from the predetermined current threshold and reduce a PWM duty ratio based on the deviation of the average current from the predetermined current threshold. The PWM duty ratio corresponds to a PWM signal provided to the inverter bridge.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects and aspects of the disclosure will become apparent by consideration of the detailed description and accompanying drawings.

DETAILED DESCRIPTION

As noted above, current drawn by a power tool motor may vary based on the load on a driven implement of the tool, such as a driver bit, a drill bit, a saw chain (e.g., on a chain saw), a saw blade, and the like. For example, more current may be drawn in high load situations (e.g., cutting through hard, thick wood) than in low load situations (e.g., cutting through soft, thin wood). In battery powered power tools, excess current draw may result in reduced run time of the power tool or damage to the battery pack.

Figure 1:
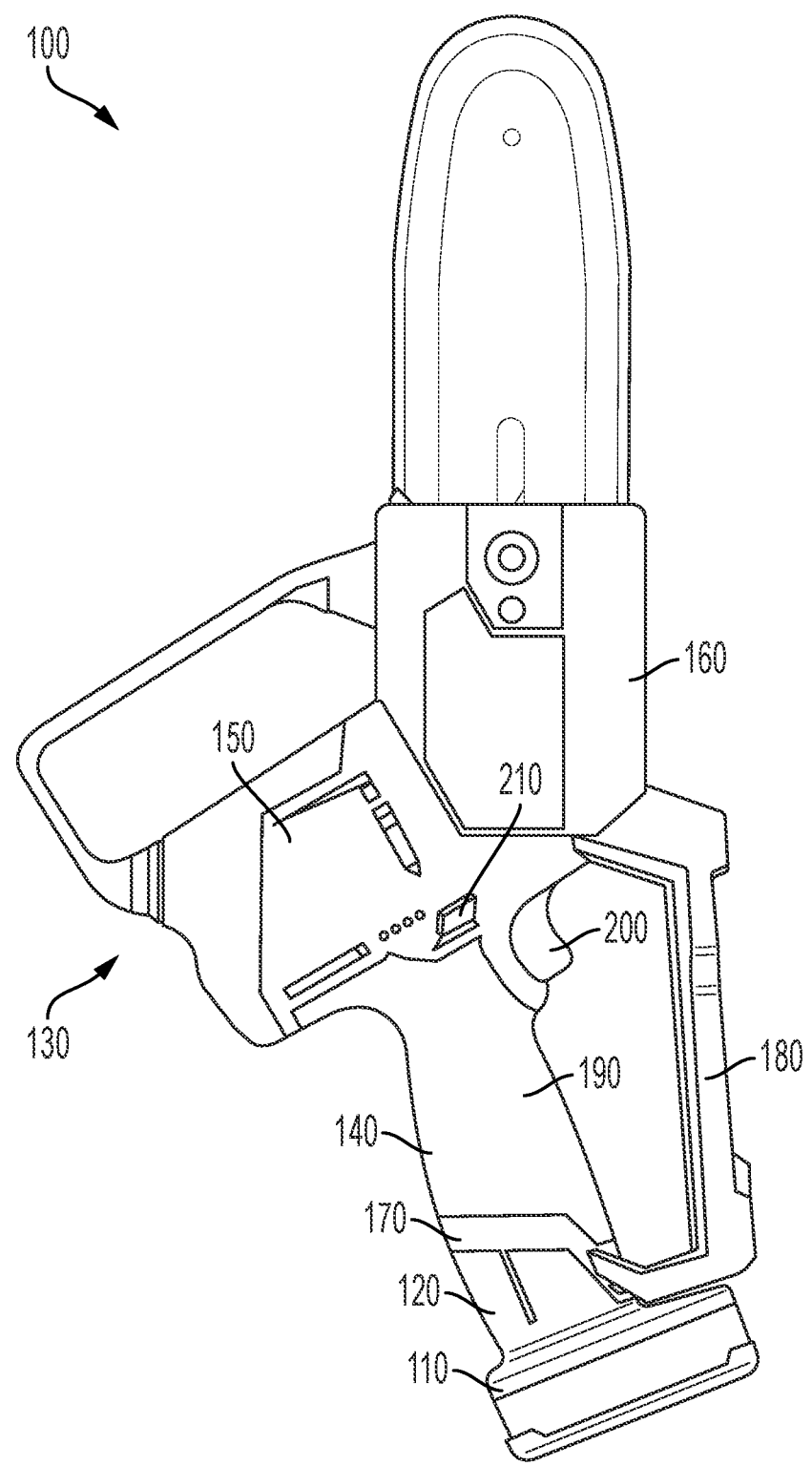
FIG. 1 is a side view of a power tool in accordance with some embodiments.

FIG. 1 illustrates one example embodiment of a power tool 100. In the example illustrated, the power tool 100 is a powered handheld pruner or a portable chainsaw. The chainsaw 100 is powered by a rechargeable power tool battery pack 110. For example, the illustrated battery pack 110 is an interchangeable battery pack configured to connect to and power a variety of tools in addition to the chainsaw 100. In the illustrated embodiment, the battery pack 110 includes a stem 120. In other embodiments, the battery pack 110 is a slide-type battery back and does not include the stem 120. In some embodiments, the battery pack 110 is a 12-volt lithium-ion battery pack including three battery cells (not shown) connected in series. In other embodiments, the battery pack 110 may include fewer or more battery cells, and the battery pack 110 may have other nominal output voltages, such as 14.4 volts, 18 volts, etc. Additionally or alternatively, the battery cells may have chemistries other than lithium-ion such as, for example, nickel cadmium, nickel metal-hydride, or the like. In still other embodiments, the chainsaw 100 may be a corded power tool.

With continued reference to FIG. 1, the chainsaw 100 includes a housing 130. The housing 130 defines a handle housing portion 140, a motor housing portion 150 and a drive housing portion 160. In the illustrated embodiment, the handle housing portion 140 extends from the drive housing portion 160 and the motor housing portion 150. In other embodiments, the handle housing portion 140 may extend from either the drive housing portion 160 or the motor housing portion 150. In the illustrated embodiment, the handle housing portion 140 includes a battery receiving portion 170 disposed opposite the motor housing portion 150. At least a portion of the battery pack 110 may be coupled to the battery receiving portion 170. In other embodiments, the battery receiving portion 170 may be defined elsewhere on or within the housing 130.

Referring to FIG. 1, the illustrated housing 130 further includes a handle guard 180 that extends between the drive housing portion 160 and the battery receiving portion 170. The handle housing portion 140 includes at least one grip surface 190 for a user to grasp while operating the chainsaw 100. The handle guard 180 may support removable adjusting tools or buttons for adjusting settings on the chainsaw 100. A switch 200 is positioned on the handle housing portion 140 for operating the chainsaw 100. As illustrated, the switch 200 is an on/off trigger switch. In other embodiments, the switch 200 may be a variable speed trigger switch, a two speed trigger switch, a push button, or another suitable actuator. An additional current limiting switch 210 is provided on the handle housing portion 140 close to the switch 200 and accessible by the user such that the switch 200 and the current limiting switch 210 may be operated using one hand of the user. The current limiting switch 210 is, for example, a two position switch for enabling or disabling the current limiting feature as described below. In some embodiments, the current limiting switch 210 may be provided at other locations, for example, on the handle guard 180, on the drive housing portion 160, on motor housing portion 150. In other embodiments, the current limiting switch 210 may be provided outside the tool, for example, on a graphical user interface of a smart telephone executing a software application, where the smart telephone is in wireless communication with the chainsaw 100 via respective compatible wireless communication interfaces (e.g., Bluetooth® or WiFi® transceivers) on the smart telephone and chainsaw 100.

Figure 2:
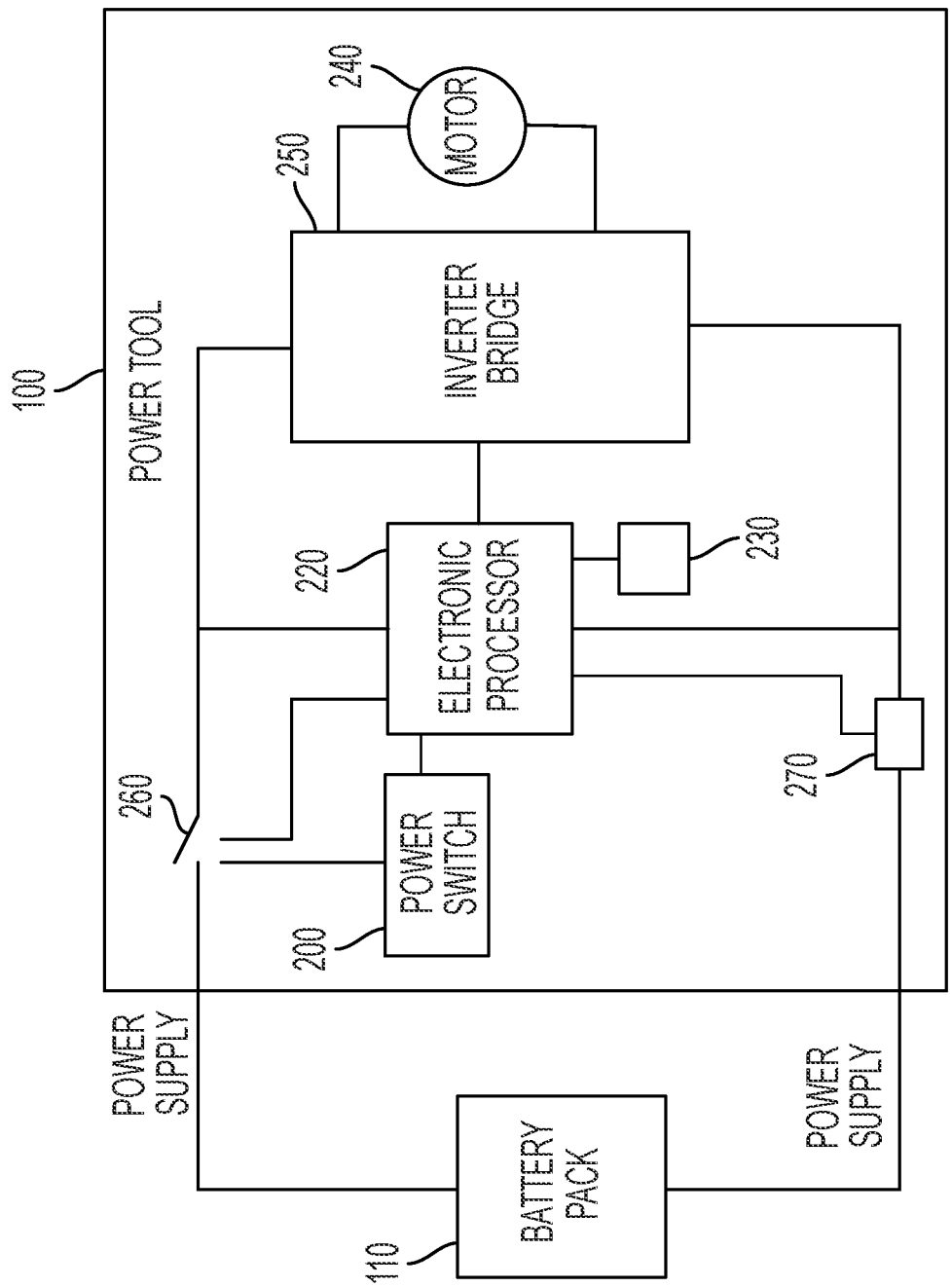
FIG. 2 is a block diagram of the power tool of FIG. 1 in accordance with some embodiments.

With reference to FIG. 2, the chainsaw 100 includes an electronic processor 220, a memory 230, a motor 240, an inverter bridge 250, a discharge switch 260, and a current sensor 270. The electronic processor 220 may be implemented as, for example, a microprocessor, a microcontroller, a field programmable gate array, an application specific integrated circuit, or the like. The memory 230 may be part of the electronic processor 220 or may be a separate component. The memory 230 may include, for example, a program storage area and a data storage area. The memory 230 stores executable instructions that when executed by the electronic processor 220, cause the chainsaw 100 to perform the functions described herein. For example, the electronic processor 220 controls the motor 240 and the current supply between the battery pack 110 and the motor 240. The electronic processor 220 and the memory 230 together form an electronic controller.

The motor 240 may be a brushless direct current motor. The inverter bridge 250 includes a plurality of field effect transistors (FETs) coupled between the battery pack 110 and the motor 240. The electronic processor 220 controls, for example, through a gate driver (not shown) that may be separate or incorporated into the electronic processor 220, a pulse width modulated cycle of the plurality of FETs to operate and control the speed of the motor 240. The electronic processor 220 may use closed-loop speed control, open-loop speed control, or a combination of the two to operate the motor 240. Particularly, in the present application, operating the motor 240 at a selected speed may include operating the motor 240 at a particular speed using closed-loop speed control, operating the motor 240 at a particular duty cycle using open-loop speed control, or the combination of the two. In closed-loop speed control, for example, the electronic processor 220 receives a desired speed (for example, via variable speed trigger switch 200), drives the inverter bridge 250 at an initial pulse width modulated (PWM) duty cycle, detects speed of the motor 240 (for example, using Hall sensors configured to detect rotation of the rotor magnets), and adjusts the PWM duty cycle up or down to achieve the desired speed. In open loop speed control, for example, the electronic processor 220 receives a desired speed (for example, proportional to a depression amount of variable speed trigger switch 200), accesses a lookup table stored in the memory 230 to obtain a PWM duty cycle mapped to the desired speed, and drives the inverter bridge 250 at the PWM duty cycle obtained from the memory. In some embodiments, where the switch 200 is an ON/OFF switch, the electronic processor 220 sets the desired speed based on the load on the motor 240 or other criteria as described below and stored in the memory 230.

The power tool 100 includes a transmission (in the drive housing portion 160) to transfer the rotation motion of the motor 240 to the driven tool implement (for example, the chainsaw or pruner chain). Accordingly, by controlling the motor speed (e.g., via open- or closed-loop speed control), the tool output is also controlled. The power tool 100 is activated by actuating the switch 200. Actuating the switch 200 to the ON position may close the discharge switch 260 allowing current to flow from the battery pack 110 to the motor 240. Similarly, actuating the switch 200 to the OFF position may open the discharge switch 260 terminating the current flow between the battery pack 110 and the motor 240. In some embodiments, rather than directly controlling the discharge switch 260, the switch 200 provides a signal to the electronic processor 220, which in turn controls the discharge switch 260 based on the signal received from the switch 200.

The current sensor 270 measures current flowing to the motor 240 and provides an indication of the amount of current flow to the electronic processor 220. In some embodiments, the current sensor 270 continuously provide an indication of instantaneous current flowing to the motor 240. In other embodiments, the current sensor 270 provides the indication of instantaneous current at discrete time intervals. The electronic processor 220 receives the indications and may determine an average current over a predetermined time period. In some embodiments, a slow response filter (e.g., a low-pass filter), a fast response filter, a combination of the slow and fast response filter may be provided between the current sensor 270 and the electronic processor 220. The filter, continuously or at discrete time intervals, provides an indication of the average current to the electronic processor 220.

Operating the chainsaw 100 at high current draw may quickly deplete the battery resulting in reduced runtime of the chainsaw 100. Operating the chainsaw 100 at high current draw for long periods of time may also generate heat in the chainsaw 100. In some embodiments, the electronic processor 220 may shut off the tool when the current draw exceeds a predetermined threshold to extend the run time and reduce heat generation. However, this deteriorates the user experience of the power tool 100. Particularly, frequent stopping and starting of the chainsaw 100 may cause annoyance to the user.

Figure 3:
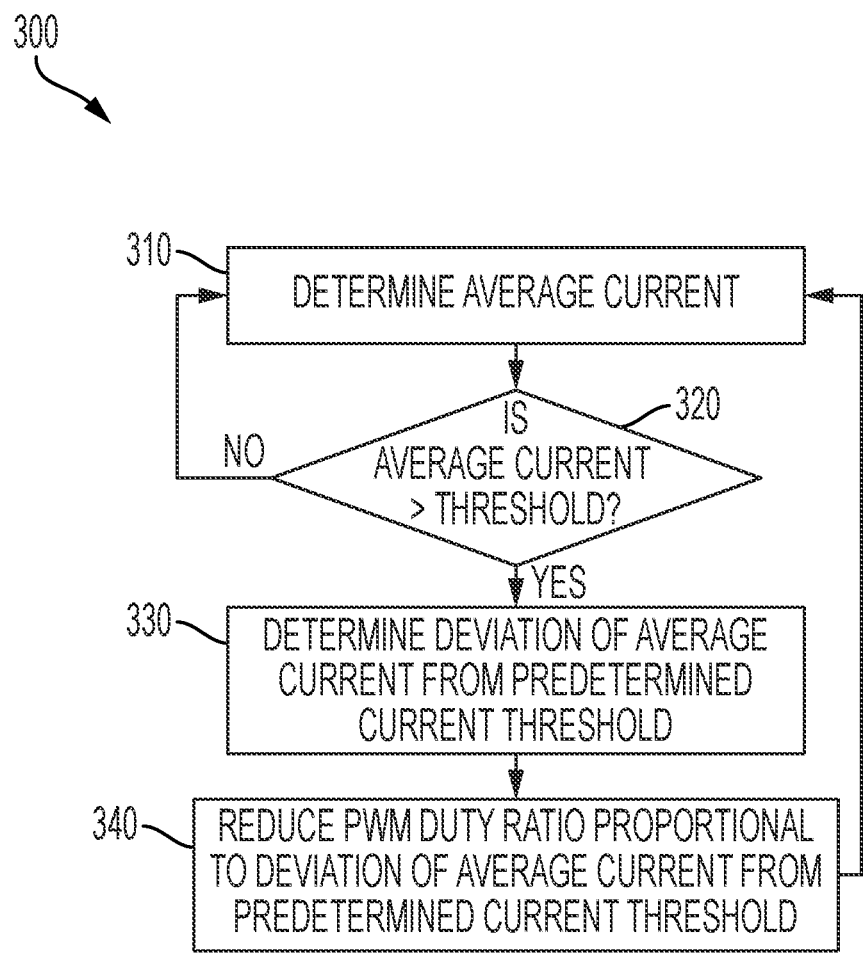
FIG. 3 is a flowchart of a method for selectable current limiting for the power tool of FIG. 1 in accordance with some embodiments.

FIG. 3 is a flowchart of an example method 300 for selective current limiting of the chainsaw 100. While described with respect to the chainsaw, the method is also applicable to other power tools (e.g., drill-drivers, impact tools, reciprocating saws, circular saws, miter saws, sanders, and the like). The method 300 includes determining, using the current sensor 270, an average current (at block 310).

The electronic processor 220 determines the average current based on the indications received directly from the current sensor 270 or through an average filter. The electronic processor 220 may determine the average current from startup of the tool to the instant of current measurement. Alternatively, the electronic processor 220 may determine a moving average of current at every measurement instance or average current over a predetermined time period. The moving average is, for example, a slow-moving current average determined by passing the current sensor 270 readings through a slow response filter or a fast-moving current average determine by passing the current sensor 270 readings through a fast response filter. The slow response filter determines an average current over a longer period of time than the fast response filter. In some embodiments, the electronic processor 220 determines different averages based on the fast-moving current average and the slow-moving current average.

The method also includes determining, using the electronic processor 220, whether the average current exceeds a predetermined current threshold (at block 320). The electronic processor 220 compares the average current to the predetermined current threshold stored in the memory 230. When the average current exceeds the predetermined current threshold, the electronic processor 220 proceeds to block 310 to determine the next instance or interval of average current. The electronic processor 220 then includes determining a deviation of the average current from the predetermined current threshold (at block 330) when the average current exceeds the predetermined current threshold. In some embodiments, the electronic processor 220 determines the average current using software executing a comparison. In some embodiments, the electronic processor 220 determines the average current using an external comparator that receives and compares the predetermined current threshold and the average current. The comparator then sends to the electronic processor 220 an indication of how much the average current deviates from the predetermined current threshold.

The method 300 includes reducing, using the electronic processor 220, a PWM duty ratio proportionally to the deviation of the average current from the predetermined current threshold (at block 340). The electronic processor 220 reduces the PWM duty ratio of the PWM signals provided to the plurality of FETs in the inverter bridge 250. The amount by which the PWM duty ratio is reduced is based on (e.g., proportional to) the amount by which the average current deviates from the predetermined current threshold. In some embodiments, reducing the PWM duty ratio proportional to the deviation includes reducing the PWM duty ratio in steps. For example, for 0-10% of maximum deviation, the PWM duty ratio may be reduced by 10%, for 10-20% of maximum deviation, the PWM duty ratio may be reduced by 20%, and so on. In other embodiments, reducing the PWM duty ratio proportional to the deviation includes reducing the PWM duty ratio continuous with the percentage of maximum deviation. Maximum deviation is, for example, the difference between an absolute current limit of the chainsaw 100 and the predetermined current threshold.

In one example, the chainsaw 100 includes a PWM duty ratio maximum limit. The PWM duty ratio maximum limit is for example 100%. When the chainsaw 100 is turned on or after a soft start period after being turned on, the chainsaw 100 operates at a speed corresponding to the PWM duty ratio maximum limit. The chainsaw 100 also includes a PWM duty ratio lower limit. The PWM duty ratio lower limit is, for example, 30%. In some embodiments, the electronic processor 220 does not reduce the PWM duty ratio below the PWM duty ratio lower limit, even when the deviation between the average current and the predetermined current threshold exceeds the difference between the PWM duty ratio maximum limit and the PWM duty ratio lower limit.

Figure 4:
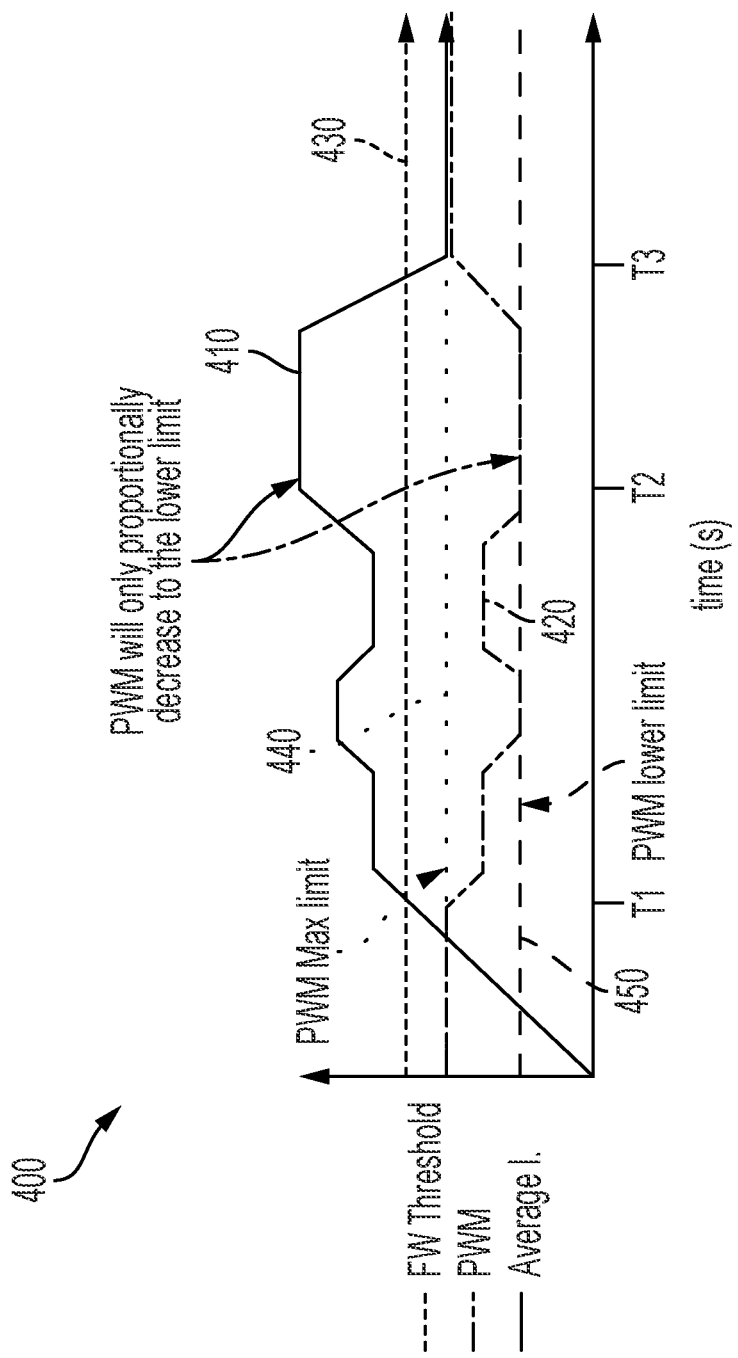
FIG. 4 is a graphical illustration of the relationship between average current, current threshold, PWM settings of the power tool of FIG. 1 when current limiting is enabled in accordance with some embodiments.

FIG. 4 illustrates a line graph 400 of the method 300 for selective current limiting of the chainsaw 100. The line graph 400 plots the average current 410, the PWM duty ratio 420, and the predetermined current threshold 430 over an operation time of the chainsaw 100. As illustrated, the chainsaw 100 operates at a PWM duty ratio maximum limit 440 at startup. The electronic processor 220 tracks the average current 410 from startup. When the average current 410 exceeds the predetermined current threshold 430 at time T1, the electronic processor 220 reduces the PWM duty ratio 420 in proportion to the difference between the average current 410 and the predetermined current threshold 430. The electronic processor 220 increases and decreases the PWM duty ratio 420 based on the average current 410 exceeding the predetermined current threshold 430 as shown in the line graph 400. However, as shown at time T2, the electronic processor 220 does not reduce the PWM duty ratio below the PWM duty ratio lower limit 450 even when the difference between the average current 410 and the predetermined current threshold 430 exceeds the difference between the PWM duty ratio maximum limit 440 and the PWM duty ratio lower limit 450. At time T3, when the average current 410 returns below the predetermined current threshold 430, the electronic processor 220 increases the PWM duty ratio 420 back to the PWM duty ratio maximum limit.

In some embodiments, the current limiting method 300 is only performed when the current limiting is enabled by a user. As discussed above, the user may enable or disable the current limiting feature using the current limiting switch 210. As also noted above, the current limiting switch 210 may be provided at various locations on the chainsaw 100, as a software button on a smart telephone application in wireless communication with the chainsaw 100, or both. The electronic processor 220 receives an indication whether the current limiting switch 210 is enabled or disabled from the current limiting switch 210 (on the chainsaw 100 or the smart telephone). The electronic processor 220 determines based on the indication whether current limiting is enabled (or disabled). In response, the electronic processor 220 performs current limiting as described with respect to method 300 when the current limiting switch 210 is enabled and does not perform the current limiting as described with respect to method 300 when the current limiting switch 210 is disabled. When the current limiting switch 210 is disabled, the electronic processor 220 may not change the PWM duty ratio proportional to the average current and may simply turn off the chainsaw 100 when the average or instantaneous current exceeds an absolute current limit.

One advantage of the above methods is increased runtime of the power tool before a battery pack is depleted.

Thus, embodiments described herein provide, among other things, selectable current limiting for a power tool.

I claim:

1. A power tool comprising:
a housing;
a motor within the housing;
a current sensor configured to measure a current flow to the motor;
an inverter bridge selectively providing power from a power source to the motor; and
an electronic processor connected to the current sensor and the inverter bridge, the electronic processor is configured to:
determine, using the current sensor, an average current,
determine whether the average current exceeds a predetermined current threshold,
determine a deviation of the average current from the predetermined current threshold, and
reduce a pulse-width-modulated ("PWM") duty ratio proportionally to the deviation of the average current from the predetermined current threshold,
wherein the PWM duty ratio corresponds to a PWM signal provided to the inverter bridge.

2. The power tool of claim 1, wherein the average current is a slow-moving current average determined by passing the current sensor readings through a slow response filter.

3. The power tool of claim 1, wherein the average current is a fast-moving current average determined by passing the current sensor readings through a fast response filter.

4. The power tool of claim 1, further comprising a trigger switch, wherein the electronic processor is further configured to drive, using the inverter bridge, the motor at a maximum duty ratio when the trigger switch is turned on.

5. The power tool of claim 4, wherein the PWM duty ratio is not reduced below a PWM duty ratio lower limit even when the difference between the average current and the predetermined current threshold exceeds the difference between the maximum duty ratio and the PWM duty ratio lower limit.

6. The power tool of claim 4, further comprising a current limiting switch, wherein the electronic processor is configured to reduce the PWM duty ratio proportionally to the deviation of the average current from the predetermined current threshold when the current limiting switch is turned on.

7. The power tool of claim 6, wherein the electronic processor is configured to stop the motor when the current limiting switch is turned off and the average current exceeds the predetermined current threshold.

8. The power tool of claim 6, wherein the current limiting switch is provided on the housing.

9. The power tool of claim 6, wherein the current limiting switch is provided on a graphical user interface of an external device in wireless communication with the power tool.

10. The power tool of claim 1, wherein the electronic processor is further configured to:
determine the deviation of the average current from the predetermined current threshold as a percentage of maximum deviation; and
reduce the PWM duty ratio by the percentage of maximum deviation.

11. A method for selectable current limiting for a power tool, the method comprising:
driving, using an inverter bridge of the power tool, a motor of the power tool;
determining, using a current sensor of the power tool, an average current flowing to the motor;
determining, using an electronic processor of the power tool, whether the average current exceeds a predetermined current threshold;
determining, using the electronic processor, a deviation of the average current from the predetermined current threshold; and
reducing, using the electronic processor, a PWM duty ratio proportionally to the deviation of the average current from the predetermined current threshold, wherein the PWM duty ratio corresponds to a PWM signal provided to the inverter bridge.

12. The method of claim 11, wherein the average current is a slow-moving current average determined by passing the current sensor readings through a slow response filter.

13. The method of claim 11, wherein the average current is a fast-moving current average determined by passing the current sensor readings through a fast response filter.

14. The method of claim 11, further comprising driving, using the inverter bridge, the motor at a maximum duty ratio when a trigger switch of the power tool is turned on.

15. The method of claim 14, wherein the PWM duty ratio is not reduced below a PWM duty ratio lower limit even when the difference between the average current and the predetermined current threshold exceeds the difference between the maximum duty ratio and the PWM duty ratio lower limit.

16. The method of claim 14, wherein reducing the PWM duty ratio proportionally to the deviation of the average current from the predetermined current threshold is performed when a current limiting switch is turned on.

17. The method of claim 16, further comprising stopping the motor when the current limiting switch is turned off and the average current exceeds the predetermined current threshold.

18. The method of claim 16, wherein the current limiting switch is provided on a housing of the power tool.

19. The method of claim 11, further comprising:
determining the deviation of the average current from the predetermined current threshold as a percentage of maximum deviation; and
reducing the PWM duty ratio by the percentage of maximum deviation.

20. A power tool comprising:
a housing;
a motor within the housing;
a current sensor configured to measure a current flow to the motor;
an inverter bridge selectively providing power from a power source to the motor; and
an electronic processor connected to the current sensor and the inverter bridge, the electronic processor is configured to:
determine, using the current sensor, an average current,
determine whether the average current exceeds a predetermined current threshold,
determine a deviation of the average current from the predetermined current threshold, and
reduce a pulse-width-modulated ("PWM") duty ratio based on the deviation of the average current from the predetermined current threshold,
wherein the PWM duty ratio corresponds to a PWM signal provided to the inverter bridge.

* * * * *